(12) United States Patent
Lee

(10) Patent No.: US 6,852,953 B1
(45) Date of Patent: Feb. 8, 2005

(54) MULTI-FUNCTIONAL ELECTRIC OVEN

(76) Inventor: Wen-Ching Lee, P.O. Box No. 6-57, Junghe, Taipei 235 (TW)

(*) Notice: Subject to any disclaimer, the term of this patent is extended or adjusted under 35 U.S.C. 154(b) by 0 days.

(21) Appl. No.: 10/777,121

(22) Filed: Feb. 13, 2004

(51) Int. Cl.7 .......................... A47J 37/00; A47J 37/12; A21B 1/06; A21B 1/14; F27D 11/02
(52) U.S. Cl. ...................... 219/393; 219/386; 219/414; 219/430; 99/448
(58) Field of Search ................................ 219/385, 386, 219/391–393, 396–398, 414, 430, 432, 433; 99/448, 337, 338

(56) References Cited

U.S. PATENT DOCUMENTS

| | | | | |
|---|---|---|---|---|
| 1,959,198 A | * | 5/1934 | Conry | 126/9 R |
| 2,234,596 A | * | 3/1941 | Heilman | 126/275 R |
| RE22,176 E | * | 9/1942 | Russell et al. | 219/393 |
| 3,316,389 A | * | 4/1967 | Markowitz | 219/393 |
| 4,641,015 A | * | 2/1987 | Mayeur | 219/386 |
| 5,682,809 A | * | 11/1997 | Harrison | 99/339 |
| 5,740,721 A | * | 4/1998 | Bizard et al. | 99/337 |
| 6,111,226 A | * | 8/2000 | Lee | 219/393 |
| 6,499,390 B1 | * | 12/2002 | Huang | 99/337 |

* cited by examiner

*Primary Examiner*—Joseph Pelham

(57) ABSTRACT

A multi-functional electric oven structure capable of roasting, sauté, steaming and deep-frying functions, includes a detachable panel at front and upper portions thereof, respectively; an electrothermal tube at lower and upper portions of an interior thereof, respectively; a roast net above the lower electrothermal tube, and a support frame above the upper electrothermal tube, wherein the support frame is for placing a sauté utensil and a deep-frying utensil, and thereby providing the electric oven with roasting, sauté, steaming and deep-frying functions; and a micro-tuning switch on the support frame. When the sauté utensil and the deep-frying utensil are removed from the support frame, the micro-tuning switch is activated, so as to cut off electric connection of the electric oven and to prevent operational hazards.

6 Claims, 9 Drawing Sheets

MULTI-FUNCTIONAL ELECTRIC OVEN

BACKGROUND OF THE INVENTION (a) Field of the Invention

The invention relates to a multi-functional electric oven, and more particularly, to a multi-functional oven capable of providing roasting, sauté, steaming, deep-frying functions as well as preventing operational hazards.

(b) Description of the Prior Art

Generally speaking, a common kitchen utensil such as a frying pan, a deep-frying pot, a steaming pot, and an electric oven, is capable of providing a single function only. Apart from electric ovens and frying pans considered most frequently used, the other kitchen utensils mentioned above are in fact seldom put to use. However, common kitchen utensils are high in cost and require large rooms for packaging and storage, meaning that a kitchen originally having not much space becomes even smaller when accommodating all the kitchen utensils. Therefore, in order to be economic and to enhance effects of certain kitchen utensils, the invention provides a multi-functional electric oven.

SUMMARY OF THE INVENTION

The primary object of the invention is to provide a multi-functional oven offering roasting, sauté, steaming, deep-frying functions as well as being capable of preventing operational hazards.

A multi-functional electric oven according to the invention comprises a detachable panel at front and upper portions thereof, respectively; an electrothermal tube at lower and upper portions of an interior thereof, respectively; a roast net above the lower electrothermal tube, and a support frame above the upper electrothermal tube, wherein the support frame is for placing a sauté utensil and a deep-frying utensil, and thereby providing the electric oven with roasting, sauté, steaming and deep-frying functions; and a micro-tuning switch on the support frame. When the sauté utensil and the deep-frying utensil are removed from the support frame, the micro-tuning switch is activated to cut off electric connection of the electric oven and to prevent operational hazards.

According to the aforesaid descriptions, the sauté utensil is placed on the support frame of the electric oven. Above and within an inner periphery of the sauté utensil is an upper flatbed for covering by a lid, and below and within an inner periphery of the sauté utensil is a lower flatbed for placing a steaming plate. The deep-frying utensil is placed on the support frame of the electric oven; and has a lug at each of two sides thereof, an interior for placing a deep-frying net, and a channel at an inner upper periphery thereof for covering by a lid. The lid can be covered on the aforesaid sauté utensil or the deep-frying utensil, and has a handle at an upper surface thereof for lifting by a hand. Using the structures, the multi-functional electric oven according to the invention is capable of roasting, sauté, steaming and deep-frying functions as well as preventing operational hazards.

DETAILED DESCRIPTION OF THE PREFERRED EMBODIMENTS

To better understand the object, characteristics and functions of the invention, detailed descriptions of a preferred embodiment shall be given with the accompanying drawings below.

Figure 1:
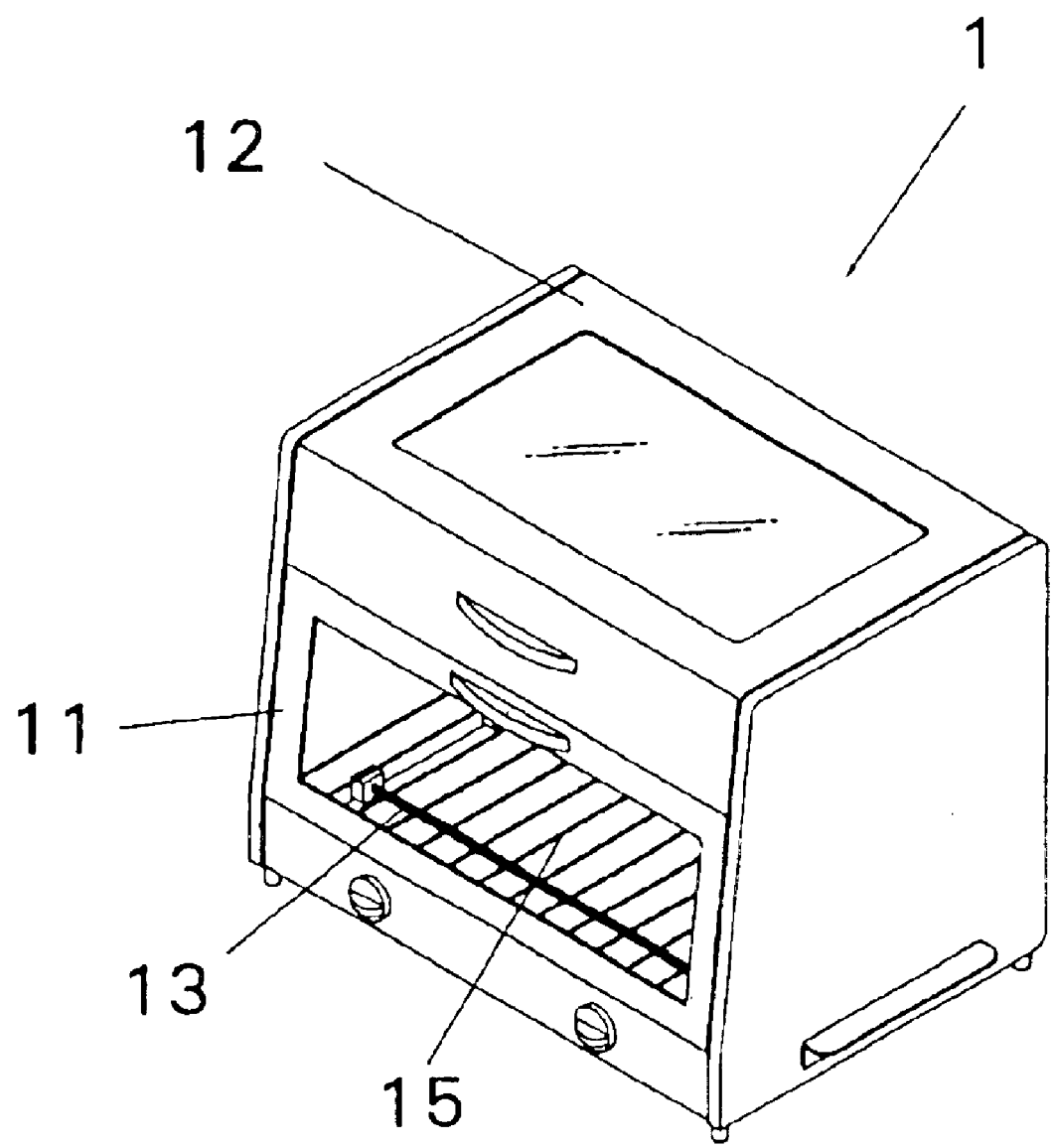
FIG. 1 shows an elevational view of the multi-functional oven according to the invention.
Figure 2:
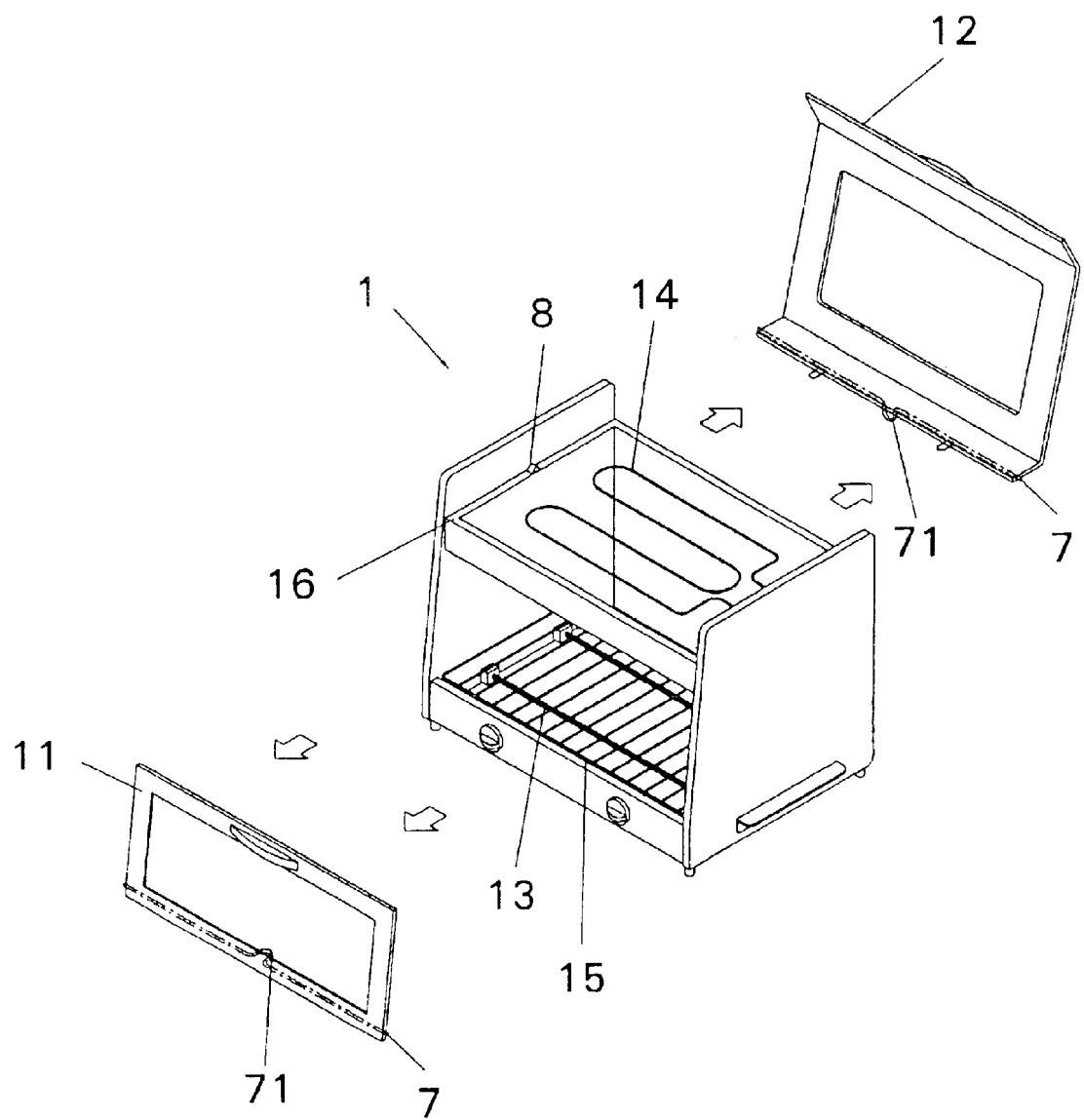
FIG. 2 shows an exploded elevational view of the multi-functional oven according to the invention.

Referring to FIGS. 1 and 2, according to the invention, a multi-functional electric oven 1 comprises detachable panels 11 and 12 at front and upper portions thereof, respectively; electrothermal tubes 13 and 14 at lower and upper portions of an interior thereof, respectively; a roast net 15 above the lower electrothermal tube 13, and a support frame 16 above the upper electrothermal tube 14, wherein the support frame 16 is for placing a sauté utensil 2 and a deep-frying utensil 3 and thereby providing the electric oven 1 with roasting, sauté, steaming and deep-frying functions; and a micro-tuning switch 8 on the support frame 16. When the sauté utensil 2 and the deep-frying utensil 3 are removed from the support frame 16, the micro-tuning switch 8 is activated, so as to cut off electric connection of the electric oven 1 and prevent hazards.

Figure 3:
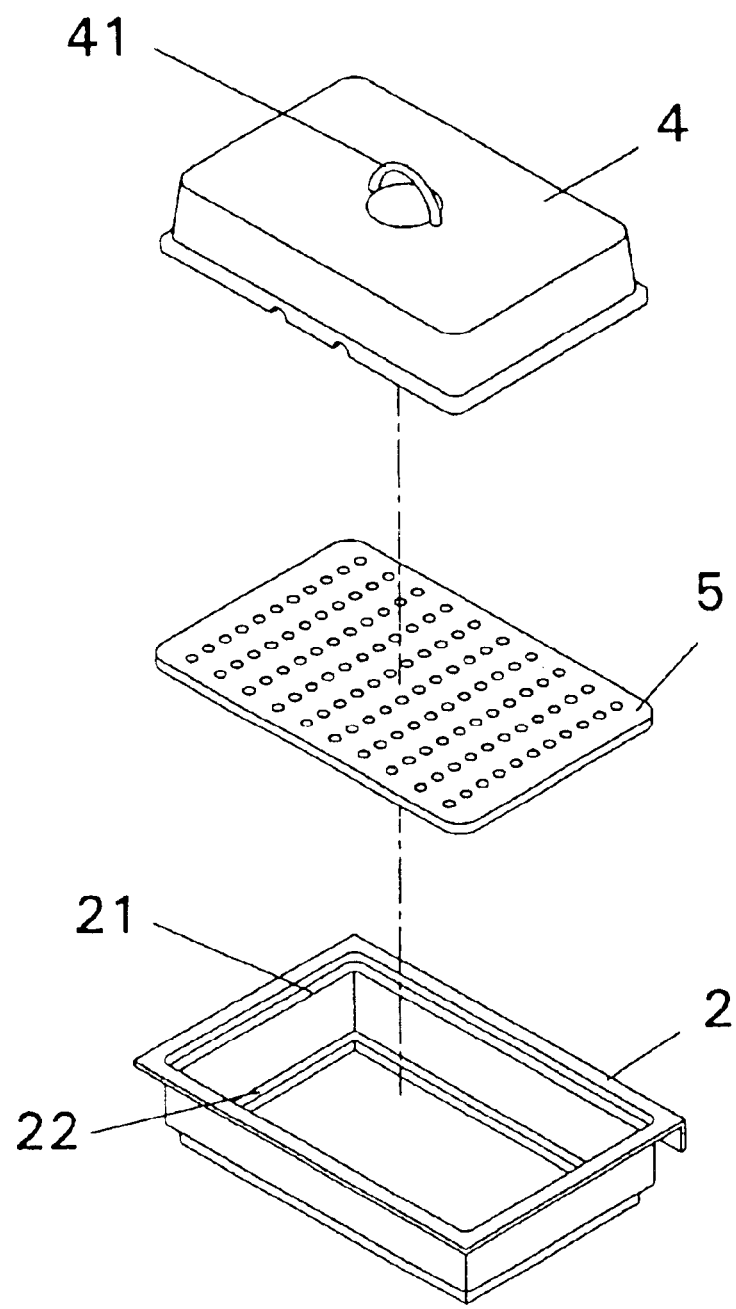
FIG. 3 shows an exploded elevational view of the sauté utensil according to the invention.
Figure 4:
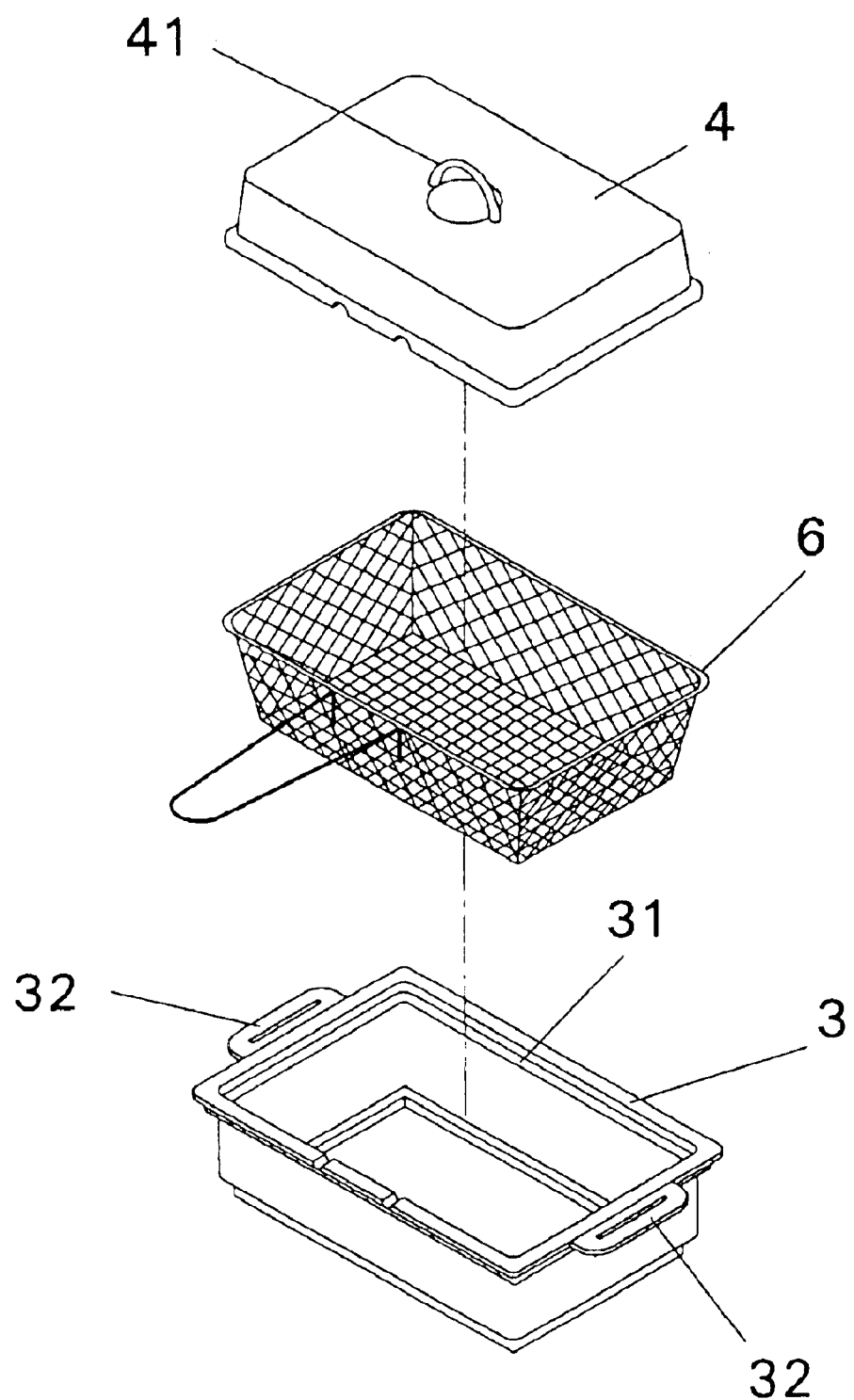
FIG. 4 shows an exploded elevational view of the deep-frying utensil according to the invention.

Referring to FIGS. 3 and 4, above and within an inner periphery of the sauté utensil 2 is an upper flatbed 21 for covering by a lid 4, and below and within an inner periphery of the sauté utensil 2 is a lower flatbed 22 for placing a steaming plate 5 so as to form a steaming utensil. The deep-frying utensil 3 has a lug 32 at each of two sides thereof, an interior for placing a deep-frying net 6, and a channel 31 at an inner upper periphery thereof for covering by a lid 4. The lid 4 can be covered on the aforesaid sauté utensil 2 or the deep-frying utensil 3, and has a handle 41 at an upper surface thereof for lifting by a hand.

Figure 5:
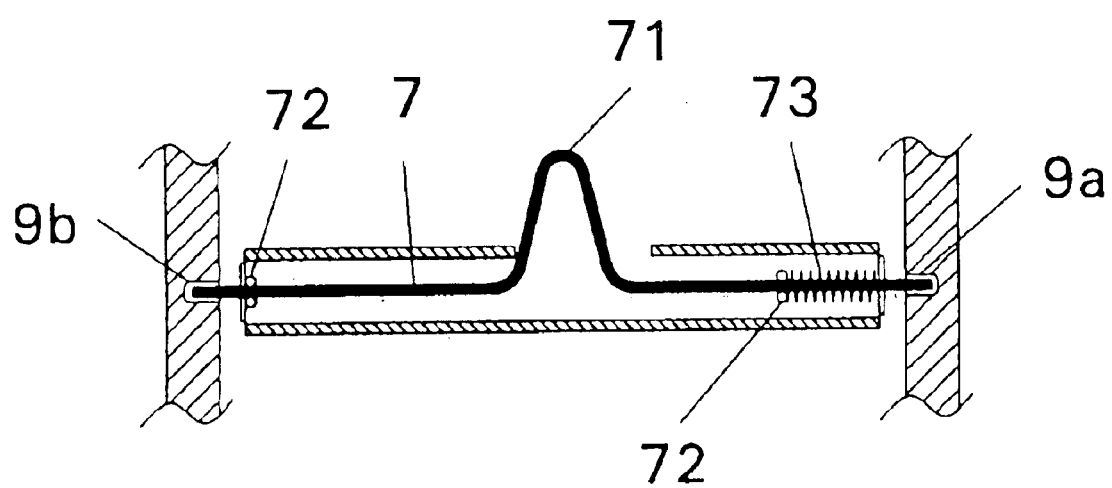
FIG. 5 shows a sectional schematic view of a door shaft according to the invention.

According to the aforesaid descriptions and with reference of FIG. 5, each of the upper panel 12 and the front panel 11 of the electric oven 1 is provided with a door shaft 7 for inserting into door shaft openings 9a and 9b. Each door shaft 7 is formed with a wrench section 71 extended in an outward direction from the panels 11 and 12, a protrusion 72 at each of two sides thereof, and an elastic element 73 accommodated at one end thereof. When the wrench sections 71 of the door shafts 7 are pushed in directions to disengage from the panels 11 and 12, the door shafts 7 are moved toward a direction of the left door shaft openings 9a while left ends of the door shafts 7 are also moved to a right side. When the left ends of the door shafts 7 exceed the left door shaft openings 9b, the panels 11 and 12 are easily detached from the two door shaft openings 9a and 9b to become disengaged.

Figure 6:
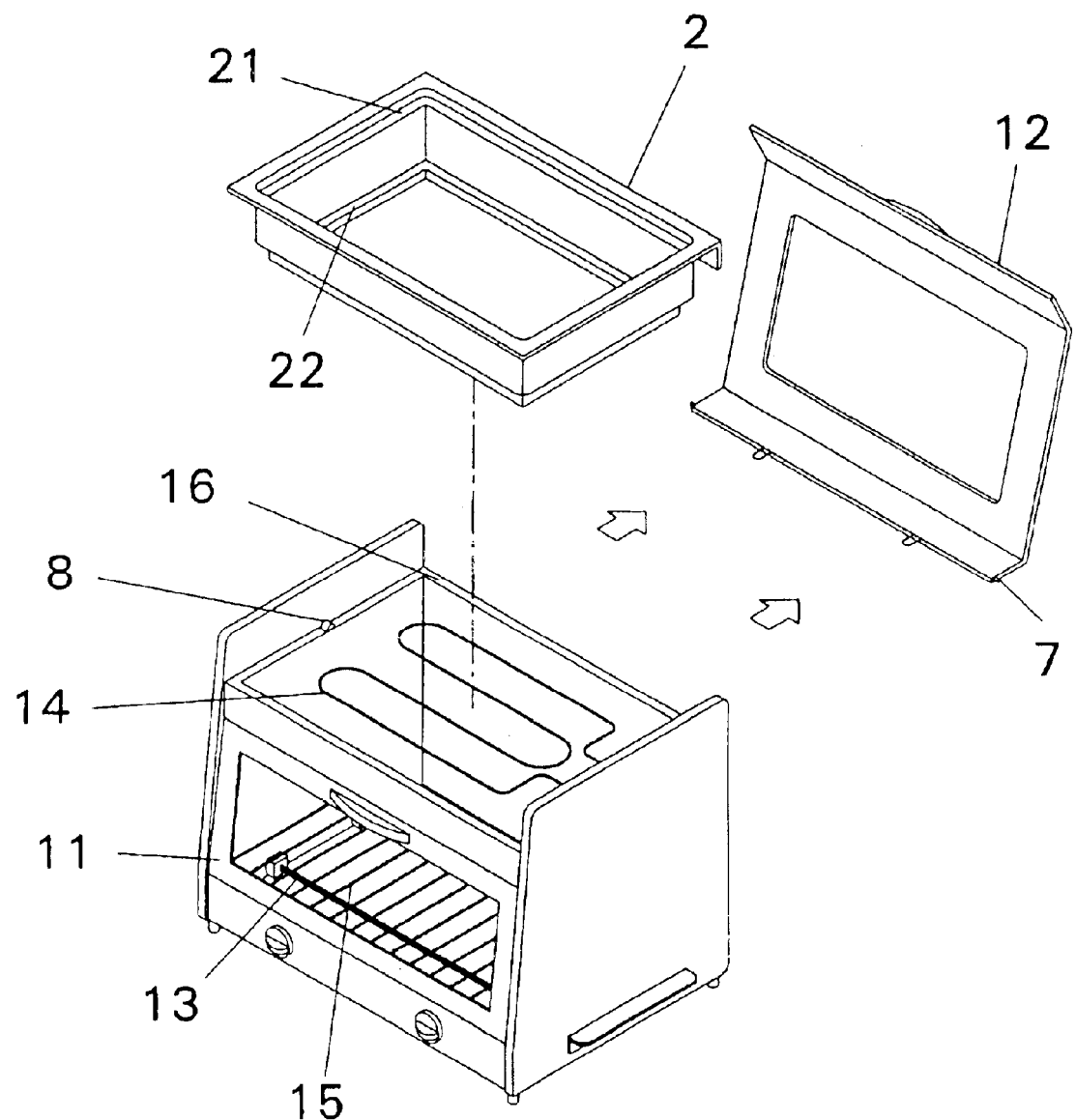
FIG. 6 shows a reference diagram illustrating the sauté utensil according to the invention being used for sauté.

Referring to FIG. 6, to use the sauté utensil 2 for cooking, the upper panel 12 is first dismantled according to the aforesaid method. The sauté utensil 2 is placed on the support frame 16, such that a lower portion of the sauté utensil 2 is pressed against the micro-tuning 8 at the support frame 16 to conduct the upper electrothermal tube 14 of the electric oven with electricity and to further enable cooking by the sauté utensil 2. When the sauté utensil 2 is removed, electric power is cut off for that the micro-tuning switch 8 is in series connection with power supply of the electric oven and thus providing operational safety.

Figure 7:
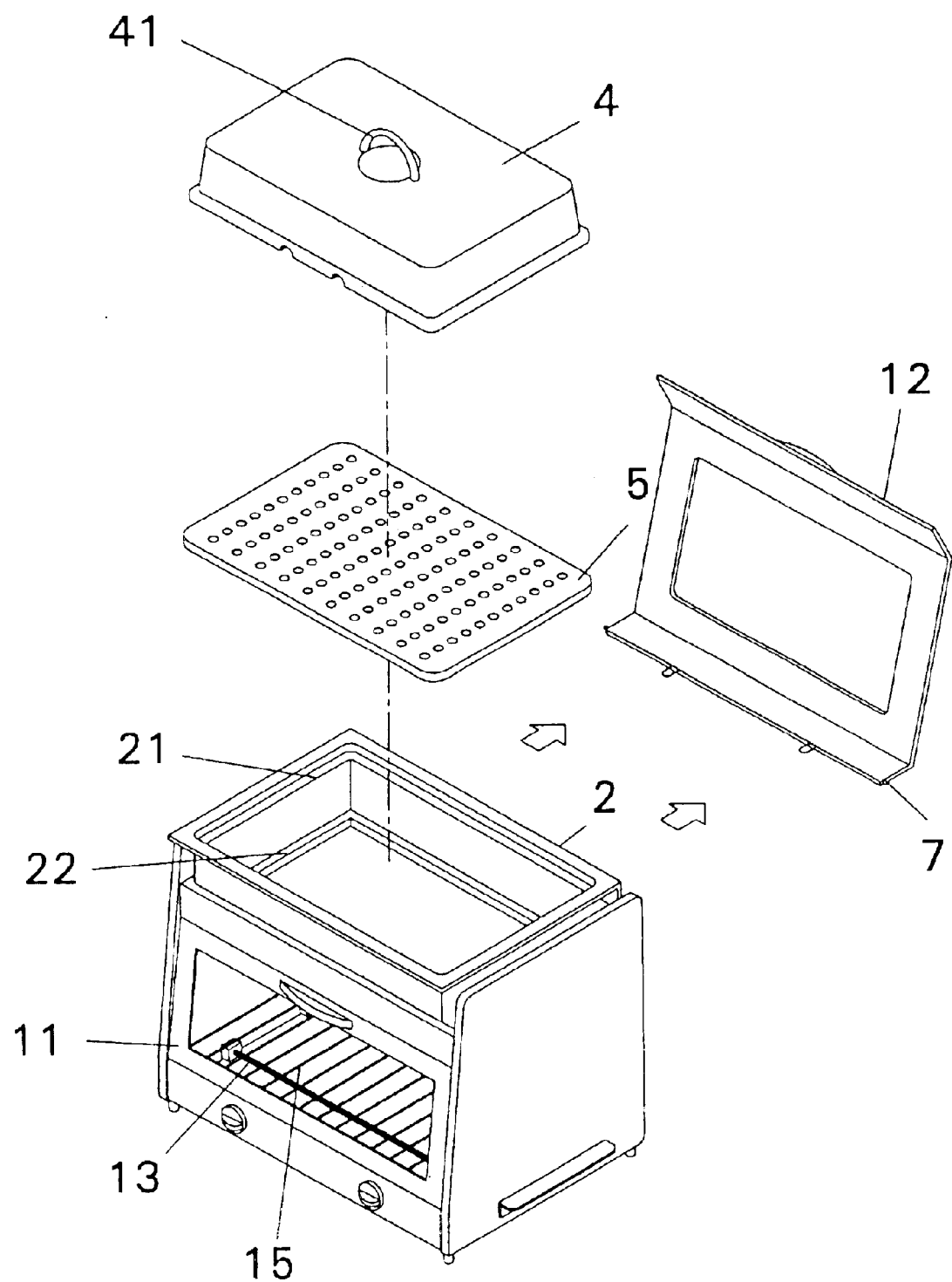
FIG. 7 shows a reference diagram illustrating the sauté utensil according to the invention being used for steaming.

Referring to FIG. 7, to use the sauté utensil 3 for cooking, the upper panel 12 is first dismantled according to the aforesaid method. The sauté utensil 2 is placed on the support frame 16, such that a lower portion of the sauté utensil 2 is pressed against the micro-tuning 8 at the support frame 16 to conduct the upper electrothermal tube 14 of the electric oven with electricity. The lower flatbed 22 of the sauté utensil 2 is placed with water, followed by placing the steam plate 6 on the lower flatbed 22. The lid 4 is finally covered on the sauté utensil 2 for cooking by steaming.

Figure 8:
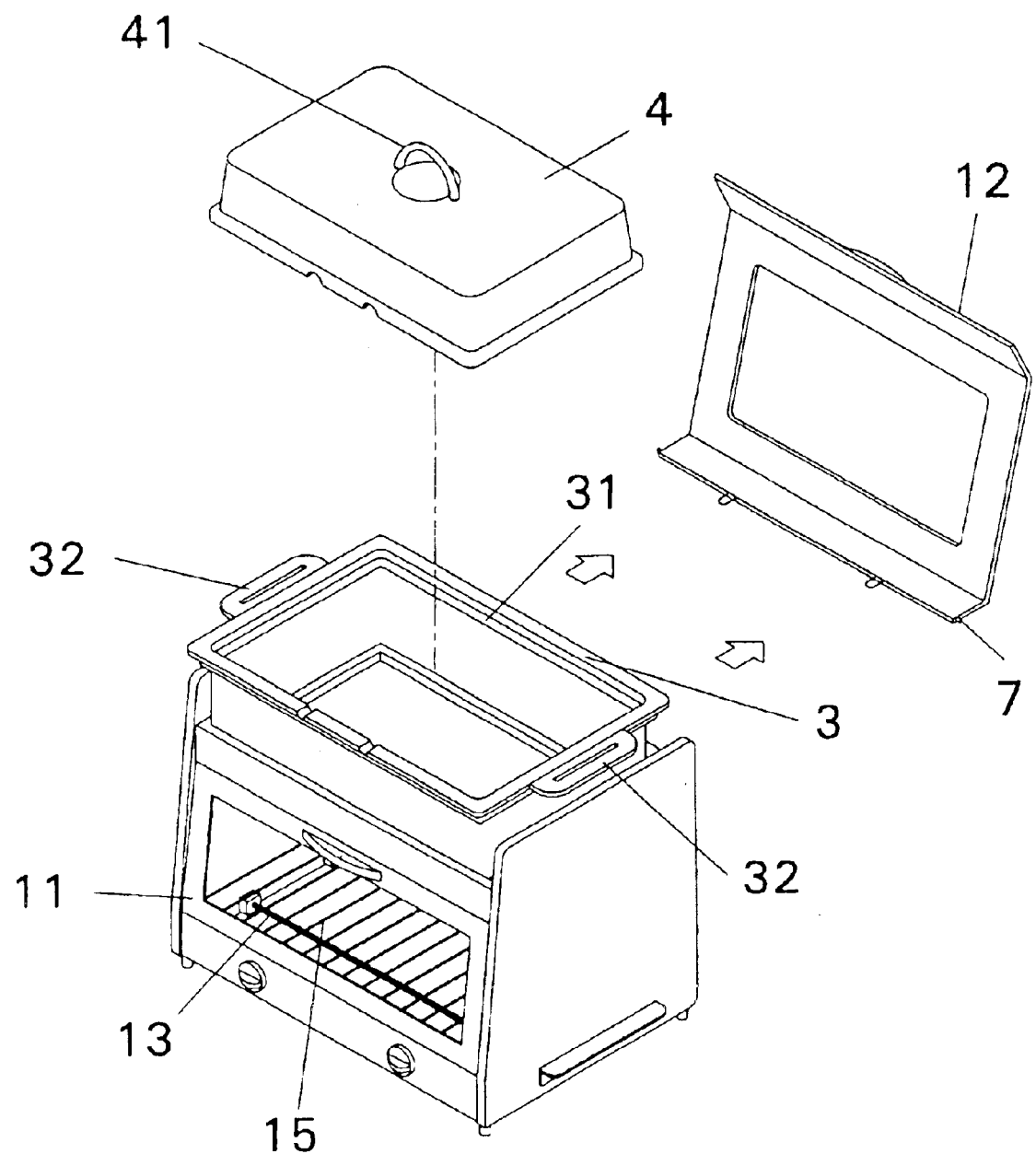
FIG. 8 shows a reference diagram illustrating the deep-frying utensil according to the invention being used for deep-frying.
Figure 9:
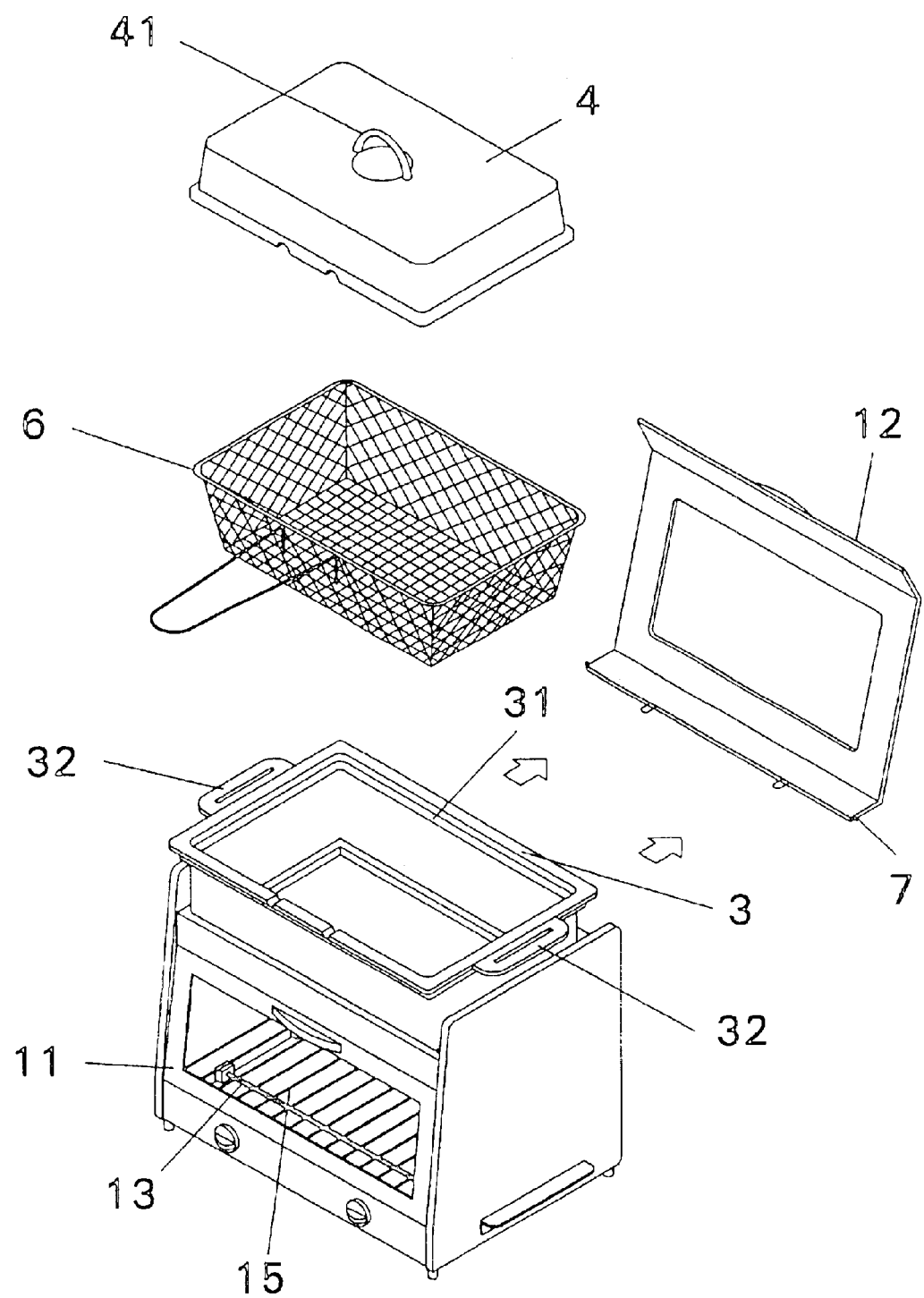
FIG. 9 shows a reference diagram illustrating the deep-frying utensil and the deep-frying net according to the invention being used for deep-frying.

Referring to FIG. 8, to use the deep-frying utensil 3 for cooking, the upper panel 12 is first dismantled according to the aforesaid method. The deep-frying utensil 3 is placed on the support from 16, such that a lower portion of deep-frying utensil 3 is pressed against the micro-tuning 8 at the support frame 16 to conduct the upper electrothermal tube 14 of the electric oven with electricity. Cooking oil is poured into the deep-frying utensil 3, and the lid 4 is covered on the deep-frying utensil 3 for cooking by deep-frying. Referring to FIG. 9, the deep-frying utensil 3 is mounted by a deep-frying net 6 to further facilitate the deep-frying process.

Conclusive from the above, the invention has the following excellences:

1. Using the described structures, the electric oven according to the invention saves expenses of other utensils by providing various cooking methods including roasting, sauté, steaming and deep-frying.
2. Using the micro-tuning switch, operational hazards are prevented for that electric power is immediately cut off when the sauté and deep-frying utensils are removed from the electric oven.

It is apparent from the aforesaid descriptions that the multi-functional electric oven according to the invention offers better practical values and economic effects than prior inventions. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A multi-functional electric oven structure comprising: an electric oven having a detachable panel at front and upper portions thereof, respectively; an electrothermal tube at lower and upper portions of an interior thereof, respectively; a roast net above the lower electrothermal tube, and a support frame above the upper electrothermal tube, wherein the support frame is for placing a sauté utensil and a deep-frying utensil, and thereby providing the electric oven with roasting, sauté, steaming and deep-frying functions; and a micro-tuning switch on the support frame; and being characterized that, when the sauté utensil and the deep-frying utensil are removed from the support frame, the micro-tuning switch is activated, so as to cut off electric connection of the electric oven and to prevent operational hazards.

2. The multi-functional electric oven structure in accordance with claim 1, wherein the sauté utensil has an upper flatbed above an inner periphery thereof and a lower flatbed below the inner periphery thereof.

3. The multi-functional electric oven structure in accordance with claim 1, wherein the deep-frying utensil has a lug at each of two sides thereof, an interior for placing a deep-frying net, and a channel at an inner upper periphery thereof for covering by a lid.

4. The multi-functional electric oven structure in accordance with claim 1, wherein an inner side of each panel has a door shaft for inserting into door shaft openings.

5. The multi-functional electric oven structure in accordance with claim 2, wherein the sauté utensil is placed with a steaming plate at an interior thereof for forming a steaming utensil.

6. The multi-functional electric oven structure in accordance with claim 4, wherein each door shaft is provided with a wrench section extended in an outward direction from the panels, a protrusion at each of two sides thereof, and an elastic element accommodated at one end thereof.

* * * * *